Aug. 11, 1942.            G. MILLER            2,292,392
SAFETY DEVICE FOR USE ON AIRCRAFT EMPLOYING RETRACTIBLE LANDING GEAR
Filed June 22, 1940
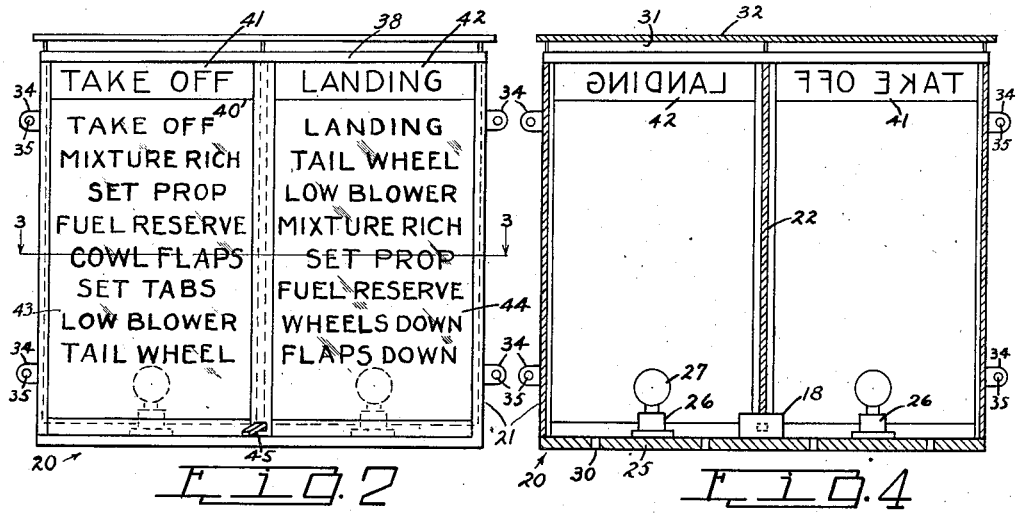
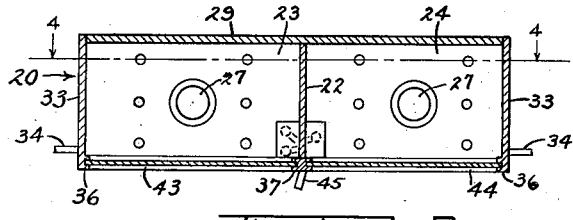
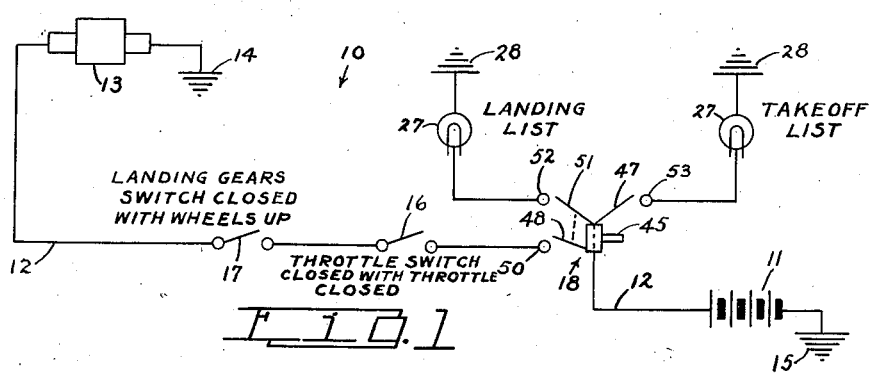
INVENTOR
GUSTAVE MILLER
BY
ATTORNEY Patented Aug. 11, 1942

2,292,392

UNITED STATES PATENT OFFICE 2,292,392

SAFETY DEVICE FOR USE ON AIRCRAFT EMPLOYING RETRACTIBLE LANDING GEARS

Gustave Miller, New Haven, Conn.

Application June 22, 1940, Serial No. 341,866

5 Claims. (Cl. 35—12)

(Granted under the act of March 3, 1883, as amended April 30, 1928; 370 O. G. 757)

This invention relates to a safety device for use on aircraft employing retractible landing gear, and has for an object to provide a circuit for actuating a warning device to warn the pilot that the retractible wheels are not extended only when the pilot is about to land, and to prevent the warning signal being falsely actuated at any other time, as for instance when the throttle is closed during formation flight, dive bombing, fighting, etc.

With the present wellknown system a warning device or howler is actuated by a switch which is closed when the throttle is closed in a circuit operating through another switch which remains closed while the landing wheels are in retracted position.

With the present device it is the theory that when the pilot is about to land he operates the landing gear to extend the wheels and closes the throttle as he approaches his landing position. Should he fail to operate the landing gears, the closing of the throttle switch completes the circuit to the howler, thereby reminding the pilot that he should operate his landing gears and thus disconnect the circuit to the howler.

In operation, however, especially in military planes, it is often necessary to close the throttle at many other times when it is not desired to land, as, for instance, in dive bombing, in formation flying, in fighting, or any other types of aerial acrobatics. With the present system, the howler or indicator is actuated each time the throttle is closed, so that after the pilot has been flying for some time he becomes so psychologically conditioned that he ignores the howler or warning indicator during such aerial acrobatics. However, it has been found in actual practice that such habit of ignoring the howler or warning indicator when such warning is false, continues with the pilot so that he still ignores the howler or warning indicator when the warning is true, and there have been thus many landings attempted with the wheels in retracted position, thus damaging or wrecking the aircraft and injuring or killing the pilot.

With this invention, however, the howler or warning indicator is operable only when the pilot is about to land the aircraft and is not operable during any previous aerial acrobatics, as a result of which, the pilot does not become falsely conditioned into a habit of ignoring the indicator, but instead is conditioned into a habit of obeying the indicator which is actuated only when it should be obeyed.

Advantage is taken of the fact that in each particular aircraft, certain particular steps must be taken when getting ready to take off or fly the aircraft, and another series of steps must be taken when getting ready to land the aircraft. To be sure that each necessary step is taken, it is desirable to provide a printed list visible to the pilot, showing what particular steps must be taken for the particular aircraft when taking off, as well as when landing. With this invention, these particular steps are made up into two lists, one a take-off list and the other a landing list, with only one list visible to the pilot at all times. The pilot must take a positive action to make the desired list visible to him. The act of selecting the desired list causes this invention to become operative.

A further object of this invention is to provide an instrument for this purpose that is extremely light in weight, that occupies a minimum amount of space in the instrument board, that may be easily attached to the instrument board, and that has but a single movable mechanical part, consisting of the switch lever and its associated switch knife contacts. This invention differs from that disclosed in Clexton, 2,262,756, of November 18, 1941, whose device has at least several movable parts, as contrasted with the single movable part of this applicant.

A further object of this invention is to provide an instrument wherein the appropriate list becomes visible through the lighting of a lamp within the instrument, and wherein the howler circuit will be suitably operated by the movement of the switch lever, even though either or both of the lamps should burn out.

With the foregoing and other objects in view, the invention consists in the construction, combination and arrangement of parts hereinafter described and illustrated in the drawing, in which, Fig. 1 is a diagrammatic outline of the circuit of this invention;

Fig. 2 is a front plan view of the lightweight instrument of this invention;

Fig. 3 is a sectional view on line 3—3 of Fig. 2; and

Fig. 4 is a sectional view on line 4—4 of Fig. 3.

There is shown in Fig. 1 the circuit 10 involving this invention. This circuit 10 includes a souce of electrical energy such as a battery 11, connected as at 12 by a conduit to a warning indicator or howler 13, which is grounded to the airplane framework as at 14, the battery being grounded as at 15. This circuit 10 is ordinarily provided with a throttle switch 16, which throttle switch 16 is normally open when the throttle is open and is closed by the act of closing the throttle. Also provided in the circuit 10 is a landing gear switch 17. This switch 17 normally remains closed while the landing wheels are retracted in flying position, and is opened to interrupt the circuit by the act of actuating the landing gears to extend the wheels to landing position.

As thus far disclosed the circuit is conventional. It is obvious that the warning indicator or howler 13 is actuated only while the throttle is closed with the landing wheels in retracted position, thus warning the pilot to extend his landing wheels when he has closed the throttle preparatory to landing. However, with this type of circuit the howler will be unnecessarily actuated if the throttle switch is closed for any other reason.

This invention provides a third switch 18, in the circuit 10. This third switch 18 is a check-off list switch and is mounted in the check-off list instrument 20 of this invention, shown in Figs. 2, 3 and 4. This check-off list instrument 20 comprises a rectangular box 21, preferably of aluminum, and divided by a partition plate 22 into two compartments 23 and 24. The floor plate 25 of these compartments acts as a support for lamp sockets 26 having lamps 27 placed therein, these lamps 27 being preferably of the single contact type and are grounded at 28 through the sockets 26 to the floor plate 25 in a conventional manner. A plurality of ventilating perforations 30 are provided in the floor plate 25 so as to permit the entry of air therein to carry off the heat produced by the lamps 27, this heated air rising and escaping through the space 31 left below the roof plate 32 forming the top of the instrument 20. The opposite sides 33 of the instrument 20 may have lugs 34 struck out therefrom, these lugs 34 being provided with central apertures 35 for receiving fastening bolts for mounting the instrument 20 in an instrument board of the aircraft on which it is being used.

The inner sides of the back wall 29, the side walls 33, the lower side of the roof 32, the upper side of the floor plate 25 and the opposite sides of the partition plate 22 will all be preferably painted black, so as to prevent any light being reflected therefrom. The front of the box 21 is provided with internally extending channeled edges 36, while an H-shaped channel bar 37 extends vertically along the front edge of the partition plate 22 to the top of the box 21. A rib 38 extends across the top of the channeled edges and channel bar to reinforce the same, and extending downwardly from this rib 38 behind the channel bar 37 and channeled edges 36 for a short distance is a flat bar 40 having the words "take-off" 41 and "landing" 42 preferably stencilled therethrough, the word "take-off" 41 thus designating the take-off side of the instrument, while the word "landing" designates the landing side of the instrument.

As will be seen, the channel in the edges 36 and the H-shaped channel bar 37 provide a frame down into which may be slid the take-off list 43 and the landing list 44. These lists may be made appropriate to the particular aircraft on which the instrument is to be used and are interchangeable so that a new list may be substituted, if necessary. The lists are preferably made by photographing an appropriate printed list on a negative of the size that will just fit within the channeled edges 36 and channel bar 37, the wording produced thus being translucent while the background is black, or opaque.

As will be apparent, with the black painted inner sides in the compartments, the wording on the lists will be invisible except when one or the other of the lamps 27 is lighted. In order to light the appropriate lamp 27, the switch 18 is mounted so as to extend through the forward lower edge of the partition plate 22, a switch lever 45 being provided to control the operation of the switch 18, and this switch lever 45 extends through the front of the instrument 20, as shown in Fig. 2, and points toward one side of the other side of the partition plate 22, thus pointing toward either the take-off or landing side of the instrument 20. When pointing toward the landing side of the instrument, the circuit from battery 11 extends through the knife blade contact 46 to the take-off list lamp 27, thus lighting up the take-off list 43 and making it visible to the pilot. At the same time, a knife blade switch 48 is disconnected from its contact 50, thus breaking the circuit 12 to the howler 13. Another knife blade switch 51 is operated in parallel with the knife blade switch 48 and controlled by the lever 45 and its circuit through its contact 52 is broken, thus preventing the current from reaching the landing list lamp 27.

In operation, the pilot merely operates the lever 45 to point toward one or the other of the take-off or landing lists. When he moves the lever 45 to point to the landing list side, then the contact knife plate 47 is moved to break its circuit to its contact 53, and the contact knife plate 48 is closed to its contact 50, and simultaneously the contact knife plate 51 is closed to its contact 52, thus lighting the lamp 27 behind the landing list. With the landing list thus visible as the pilot prepares to light, the howler 13 will come into operation when the throttle switch is closed unless the pilot has meantime lowered his landing gear to place the wheels in landing position, thus reminding him to perform this very necessary act. Should either or both of the lamps 27 burn out, they would not in any way interfere with the operation of the howler circuit, the stencilled words 41 and 42 showing the pilot which way to move the switch lever 45, even though the lamps may be burned out.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of the invention, what is claimed is:

1. In a safety device for use on aircraft the combination comprising a housing, said housing including only bottom, side, rear and top walls thus providing an open front, a partition member disposed parallel with and intermediate said side walls dividing said housing into a pair of compartments, channel means disposed vertically at the front edge of each of said side walls and H-shaped channel means disposed vertically at the front edge of said partition member thus defining a pair of slots for each compartment for receiving a panel containing transparent safety check-off indicia, the check-off indicia on one panel relating to conditions to be observed preparatory to the take-off of the aircraft, the check-off indicia on the other panel relating to the conditions to be observed preparatory to landing the aircraft, a light source for each of said compartments, and single switch means for selectively completing an electrical circuit either to one or the other of said light sources.

2. In a safety device for use on aircraft the combination comprising a housing, said housing including only bottom, side, rear and top walls thus providing an open front, said top wall being spaced from said side and rear walls and said bottom wall containing an opening therethrough to provide ventilation for said housing, a partition member disposed parallel with and intermediate said side walls dividing said housing into a pair of compartments, channel means disposed vertically at the front edge of each of said side walls and H-shaped channel means disposed vertically at the front edge of said partition member thus defining a pair of slots for each compartment for receiving a panel containing transparent safety check-off indicia, the check-off indicia on one panel relating to conditions to be observed preparatory to the take-off of the aircraft, the check-off indicia on the other panel relating to the conditions to be observed preparatory to landing the aircraft, a light source for each of said compartments, and single switch means for selectively completing an electrical circuit either to one or the other of said light sources.

3. In a safety device for use on aircraft the combination comprising a housing, said housing including only bottom, side, rear and top walls thus providing an open front, said top wall being spaced from said side and rear walls and said bottom wall containing an opening therethrough to provide ventilation for said housing, said side walls containing struck-out portions whereby said housing may be attached to a support member, a partition member disposed parallel with and intermediate said side walls dividing said housing into a pair of compartments, channel means disposed vertically at the front edge of each of said side walls and H-shaped channel means disposed vertically at the front edge of said partition member thus defining a pair of slots for each compartment for receiving a panel containing transparent safety check-off indicia, the check-off indicia on one panel relating to conditions to be observed preparatory to the take-off of the aircraft, the check-off indicia on the other panel relating to the conditions to be observed preparatory to landing the aircraft, a light source for each of said compartments, and single switch means for selectively completing an electrical circuit either to one or the other of said light sources.

4. In a safety device for use on aircraft the combination comprising a housing, said housing including only bottom, side, rear and top walls thus providing an open front, said top wall being spaced from said side and rear walls and said bottom wall containing an opening therethrough to provide ventilation for said housing, said side walls containing struck-out portions whereby said housing may be attached to a support member, a partition member disposed parallel with and intermediate said side walls dividing said housing into a pair of compartments, channel means disposed vertically at the front edge of each of said side walls and H-shaped channel means disposed vertically at the front edge of said partition member thus defining a pair of slots for each compartment for receiving a panel containing transparent safety check-off indicia, the check-off indicia on one panel relating to conditions to be observed preparatory to the take-off of the aircraft, the check-off indicia on the other panel relating to the conditions to be observed preparatory to landing the aircraft, a light source for each of said compartments, said walls defining said compartments being provided with light absorbing means whereby the said transparent indicia associated with each compartment is rendered substantially invisible unless the light source therein is illuminated, and single switch means for selectively completing an electrical circuit either to one or the other of said light sources.

5. In a safety device for use on aircraft the combination comprising a housing, said housing including only bottom, side, rear and top walls thus providing an open front, said top wall being spaced from said side and rear walls and said bottom wall containing an opening therethrough to provide ventilation for said housing, said side walls containing struck-out portions whereby said housing may be attached to a support member, a partition member disposed parallel with and intermediate said side walls dividing said housing into a pair of compartments, channel means disposed vertically at the front edge of each of said side walls and H-shaped channel means disposed vertically at the front edge of said partition member thus defining a pair of slots for each compartment for receiving a panel containing transparent safety check-off indicia, the check-off indicia on one panel relating to conditions to be observed preparatory to the take-off of the aircraft, the check-off indicia on the other panel relating to the conditions to be observed preparatory to landing the aircraft, a light source for each of said compartments, said walls defining said compartments being provided with light absorbing means whereby the said transparent indicia associated with each compartment is rendered substantially invisible unless the light source therein is illuminated, and single switch means for selectively completing an electrical circuit either to one or the other of said light sources, said switch means including an operating lever therefor adapted to point to the particular compartment which may be illuminated.

GUSTAVE MILLER.